(12) United States Patent
Huang et al.

(10) Patent No.: US 8,620,345 B2
(45) Date of Patent: Dec. 31, 2013

(54) DETERMINING TIME ZONE BASED ON LOCATION

(75) Inventors: Ronald K. Huang, Milpitas, CA (US); Morgan Grainger, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 392 days.

(21) Appl. No.: 12/756,132

(22) Filed: Apr. 7, 2010

(65) Prior Publication Data
US 2011/0250902 A1 Oct. 13, 2011

(51) Int. Cl.
*H04W 24/00* (2009.01)
(52) U.S. Cl.
USPC ............. 455/456.1; 455/412.2; 455/502; 455/503; 455/525; 455/171.1; 455/181.1; 455/231; 368/14; 368/21; 368/47; 368/6; 368/10; 368/23
(58) Field of Classification Search
USPC ........ 455/456.1, 412.2, 502, 503, 525, 171.1, 455/181.1, 231; 368/14, 21, 47
See application file for complete search history.

(56) References Cited

U.S. PATENT DOCUMENTS

| | | | | |
|---|---|---|---|---|
| 4,204,398 A | * | 5/1980 | Lemelson | 368/47 |
| 4,884,254 A | * | 11/1989 | Kawai et al. | 368/21 |
| 4,995,020 A | * | 2/1991 | Mitchell | 368/185 |
| 5,724,316 A | * | 3/1998 | Brunts | 368/10 |
| 6,278,660 B1 | * | 8/2001 | Tognazzini | 368/21 |
| 8,369,837 B2 | * | 2/2013 | Huang et al. | 455/412.2 |
| 8,504,061 B2 | * | 8/2013 | Grainger et al. | 455/456.1 |
| 2002/0191492 A1 | * | 12/2002 | Kamper et al. | 368/47 |
| 2003/0022679 A1 | * | 1/2003 | Chen et al. | 455/502 |
| 2008/0031095 A1 | * | 2/2008 | Matsuzaki et al. | 368/14 |
| 2009/0009321 A1 | | 1/2009 | McClellan et al. | |
| 2009/0135675 A1 | | 5/2009 | Akiyama | |
| 2010/0041419 A1 | * | 2/2010 | Svendsen et al. | 455/456.3 |
| 2010/0156713 A1 | * | 6/2010 | Harper | 342/357.09 |

FOREIGN PATENT DOCUMENTS

TW 542919 7/2003

OTHER PUBLICATIONS

"Polygon World Map Example," WorldTimeServer.com, Mar. 30, 2010, http://www.worldtimeserver.com/time_zone_guide/withpolygons/my . . . , 1 page.
"A question regarding Timezone web service," Mar. 30, 2010, http://forum.geonames.org/gforum/posts/list/1770 .pages, 2 pages.

* cited by examiner

*Primary Examiner* — Nimesh Patel
(74) *Attorney, Agent, or Firm* — Fish & Richardson P.C.

(57) ABSTRACT

Methods, program products, and systems of determining a time zone based on location is disclosed. In general, in one aspect, a mobile device can store one or more geometric shapes using latitude and longitude coordinates. The geometric shapes can be associated with time zones. The mobile device can determine a current location. The mobile device can identify a geometric shape in which the mobile device is currently is located. The mobile device can determine the time zone associated with the identified geometric shape.

20 Claims, 8 Drawing Sheets

DETERMINING TIME ZONE BASED ON LOCATION

TECHNICAL FIELD

This disclosure relates generally to location-based processing on a mobile device.

BACKGROUND

A modern mobile device can incorporate functions of a computer, of a cellular transceiver, or a wireless (e.g., WiFi™) transceiver. For example, the mobile device can perform traditional computer functions, such as executing application programs, storing various data, and displaying digital images. These functions can be performed in an application subsystem of the mobile device. The application subsystem can include an application processor, an application operating system, and various input/output devices.

When the mobile device functions as a cellular transceiver, the mobile device can initiate and receive phone calls, send and receive data over a cellular network, identify cellular tower connections, and determine when and whether to switch cellular towers. Similarly, the mobile device can function as a wireless radio transceiver and send and received data over a wireless network, e.g. a WiFi™ network. These radio-related functions can be performed in a baseband subsystem of the mobile device. The baseband subsystem can include a baseband processor and a baseband operating system. The baseband processor can be an integrated circuit (IC) device (e.g., a Large Scale Integrated Circuit (LSI)) that performs communication functions. The baseband processor can include, for example, a Global System for Mobile Communications (GSM) modem. The baseband processor can be can be integrated with the application processor in a System-on-Chip (SoC). In general, the application subsystem can consume more power than the baseband subsystem when activated.

SUMMARY

Methods, program products, and systems of determining a time zone based on location is disclosed. In general, in one aspect, a mobile device can store one or more geometric shapes using latitude and longitude coordinates. The geometric shapes can be associated with time zones. The mobile device can determine a current location. The mobile device can identify a geometric shape in which the mobile device is currently located. The mobile device can determine the time zone associated with the identified geometric shape.

The details of one or more implementations of techniques of determining a time zone based on location are set forth in the accompanying drawings and the description below. Other features, aspects, and advantages of determining a time zone based on location will become apparent from the description, the drawings, and the claims.

BRIEF DESCRIPTION OF THE DRAWINGS

Like reference symbols in the various drawings indicate like elements.

DETAILED DESCRIPTION

Overview of Determining Time Zone Based on Location

Figure 1:
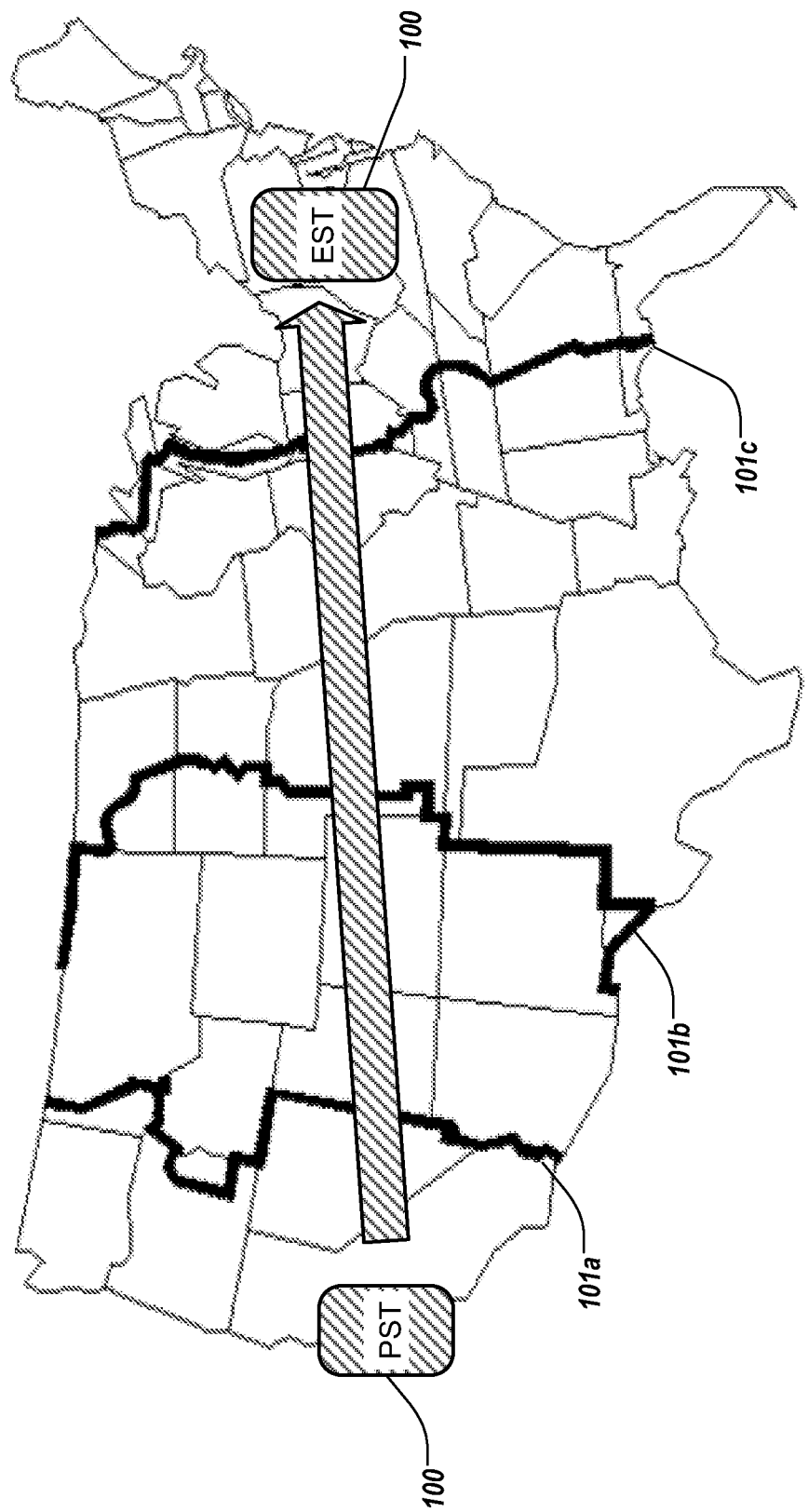
FIG. 1 illustrates an exemplary mobile device configured to determine a time zone based on a location of the mobile device.

FIG. 1 illustrates exemplary mobile device 100 configured to determine a time zone based on location of mobile device 100. Mobile device 100 can include both an application subsystem that performs functions traditionally performed on a computer, and a baseband subsystem that performs communication functions traditionally performed on a cellular telephone.

Mobile device 100 can receive, from a communications network (e.g., a wired network, a cellular network, or a wireless local area network (WLAN)), a standard time. The standard time can be coordinated universal time (UTC), Greenwich Mean Time (GMT), or any standardized time. The standard time can be received by the baseband subsystem of mobile device 100. Mobile device 100 can set and adjust an internal clock to the standard time.

Mobile device 100 can include application programs that use local time, e.g., time at where mobile device is located. For example, an alarm clock application program can be configured to sound an alarm at 7:00 am Eastern Standard Time (EST) when mobile device 100 is located in east coast regions of the United States, and 7:00 am Pacific Standard Time (PST) when mobile device 100 is located in west coast regions. Time zone information can be used to determine local time for mobile device 100. The time zone can be determined by an offset (e.g., +/− hours) from the standard time, the offset corresponding to the geographic region. The standard time plus the offset can be a local time of the geographic region. Mobile device 100 can display or otherwise use the local time if mobile device 100 has information on how much offset to use.

Mobile device 100 can acquire the offset information from the communications network using the baseband subsystem. For example, in a global system for mobile communications (GSM) wireless network, mobile device 100 can receive the offset from a network identity and time zone (NITZ) mechanism. However, not all mobile network operators implement the NITZ mechanism. In some geographic regions, mobile device 100 may not receive a wireless signal. When mobile device 100 travels from a first country to a second country, mobile device 100 may not be able to receive a NITZ signal immediately, because mobile device 100 may need time to identify a new wireless network in the second country.

A time zone can correspond to a geographic region. When mobile device 100 does not receive an NITZ signal, mobile device 100 can use the current location of mobile device 100 to determine in which geographic region mobile device 100 is located, and use the geographic region to determine the time zone. For example, mobile device 100 can travel from a first region (e.g., California, United States) that is located in a first time zone (e.g., Pacific time zone) to a second region (e.g., Virginia, United States) that is located in a second time zone (e.g., Eastern time zone). Mobile device 100, upon determining that mobile device 100 is in Virginia, can determine that a Eastern time zone (Eastern Daylight Time (EDT) or EST), even when mobile device 100 cannot receive a NITZ signal.

Mobile device 100 can store one or more geometric shapes corresponding to geographic regions that are associated with time zones. The geographic shapes can be stored as polygons by vertices of the polygons. For example, mobile device 100 can store at least four polygons that cover the 48 states of the continental United States. The four polygons can have borders defined by the borders of the United States and time zone boundaries 101*a-c*. Each of the four polygons can correspond to a time zone. For example, a polygon enclosed by border between the United States and Canada, time zone boundary 101*a*, border between the United States and Mexico, and the Western coastline of the United States can correspond to a Pacific time zone.

Mobile device 100 can initiate a process of determining time zone based on location upon a triggering event. The triggering event can include, for example, mobile device 100 being turned on, mobile device 100 exiting an airplane operating mode (in which wireless communications functions are disabled), or a user event. For example, mobile device 100 can initiate the process of determining a time zone when mobile device 100 exits an airplane that flew in from California to Virginia.

Mobile device 100 can determine a current location of mobile device 100 using various location determination techniques. For example, mobile device 100 can determine a current location using a Global Positioning System (GPS) signal, by triangulating positions of wireless access points, or by a current cell identifier (cell ID) of a cellular communications network. The current location can be a point or an area that represents an error margin. Once the current location is determined, mobile device 100 can identify a geometric shape that includes the current location. For example, mobile device 100 can determine that the current location of mobile device 100 is inside a polygon that corresponds to a region of the United States that is east of time zone boundary 101*c*. Mobile device 100 can determine that the Eastern time zone is associated with the polygon. Mobile device 100 can further determine, based on the standard time, whether EST or EDT applies. Mobile device can calculate a local time by applying an offset specified by the EST or EDT to the standard time. Mobile device 100 can configure various application programs (e.g., calendars, alarm clocks, and time-displaying screensavers) using the local time.

Figure 2:
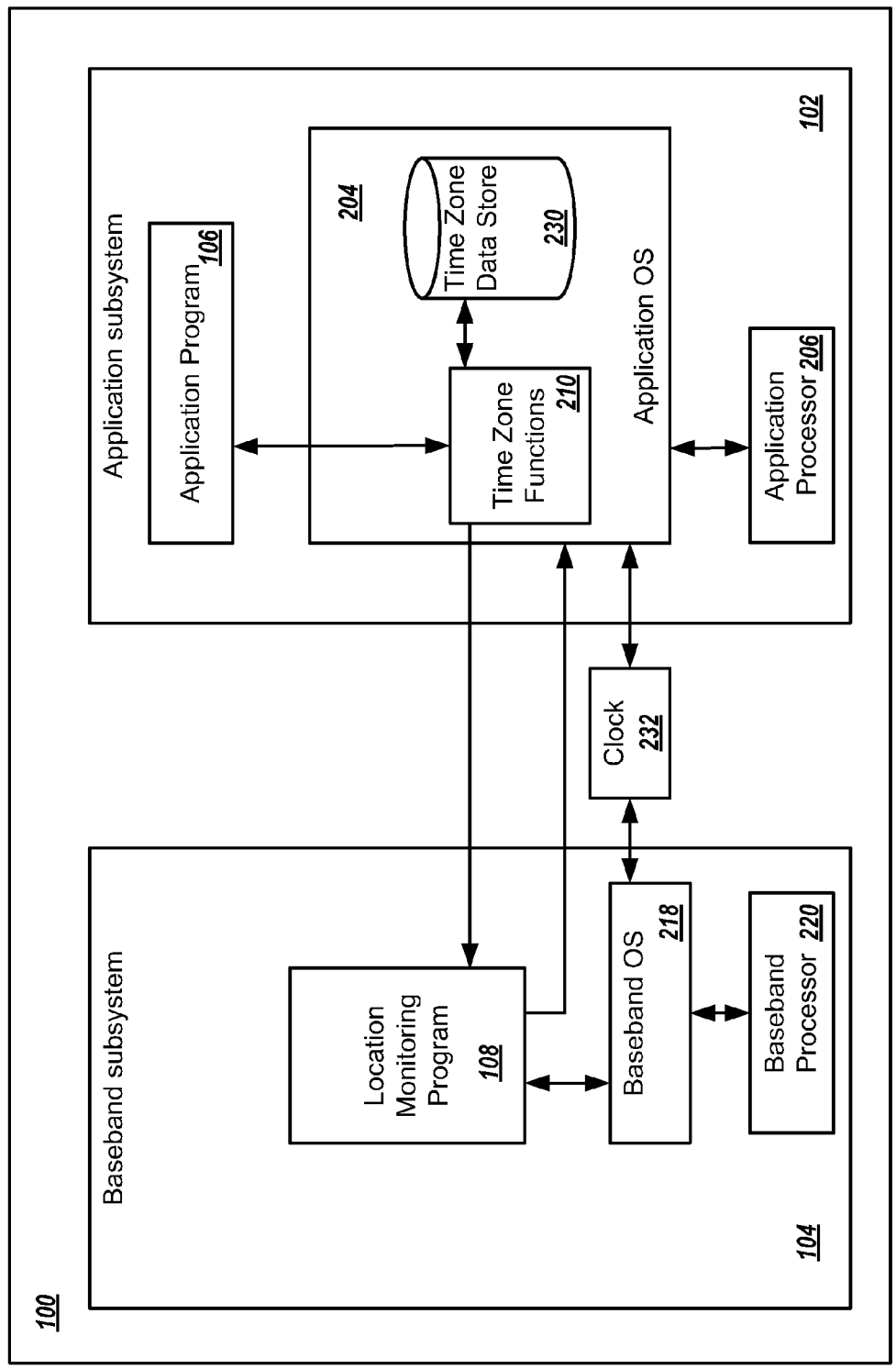
FIG. 2 is a block diagram illustrating exemplary components of a mobile device configured to determine a time zone based on a location.

FIG. 2 is a block diagram illustrating exemplary components of a mobile device configured to determine a time zone based on a location. Mobile device 100 can include, among other components, clock 232, application subsystem 102 and baseband subsystem 104. Clock 232 can be a time tracking device or application program. Clock 232 can be an independent component of mobile device 100, or be part of application subsystem 102 or baseband subsystem 104. Clock 232 can interact with application subsystem 102 and baseband subsystem 104. For example, clock 232 can be set or adjusted by either application subsystem 102 or baseband subsystem 104.

Application subsystem 102 can include application operating system 204, and application processor 206. One or more application programs 106 can execute in application subsystem 102. Application operating system 204 can include various time zone functions 210.

Time zone functions 210 can include functions for communicating with baseband subsystem 104. Time zone functions 210 can configure location monitoring program 108 to provide a current location identifier to application subsystem 102. In various implementations, the location identifiers can include, for example, a mobile country code (MCC), a mobile network code (MNC), a location area code (LAC), and a cell ID of the cellular communication network. Location monitoring program 108 can monitor the location identifiers through baseband operating system 218 and baseband processor 220. Location monitoring program 108 can be configured to send a notification to application subsystem 102 upon detecting a change (e.g., from a first cell ID to a second cell ID). The notification can include one or more location identifiers (e.g., the second cell ID).

Time zone functions 210 can include or invoke location functions for determining a current location. The location functions can include, for example, functions that determine the current location using GPS or triangulation. The location functions can include functions for determining the current location based on the location identifier received in the notification from baseband subsystem 104, by mapping the location identifier to a location. Time zone data store 230 can store one or more mappings between location identifiers and locations. The locations can be a point defined using geographic coordinates (e.g., latitudes, longitudes, and optionally, altitudes), or an area that includes a point and an error margin. The area can be a circle, an ellipse, or any other shape. The area can correspond to a geographic shape of a cell in a cellular network, or a probable geographic shape of the cell. The functions for mapping a location identifier to locations can be used to identify a location by performing a lookup in time zone data store 230 using the location identifier in the received notification.

Time zone functions 210 can include functions for determining a current time zone based on the identified location. Time zone data store 230 can store one or more geometric shapes. Each geometric shape can correspond to a geographic region. The geometric shapes can correspond to time zones and day light saving time (DST) settings. The functions for determining a current time zone can identify a geometric shape in which the identified location is located, and use the corresponding time zone and DST settings to determine a current time zone. The functions can determine an offset, which can be used in combination with a standard time from clock 232 to calculate a local time.

Figure 3:
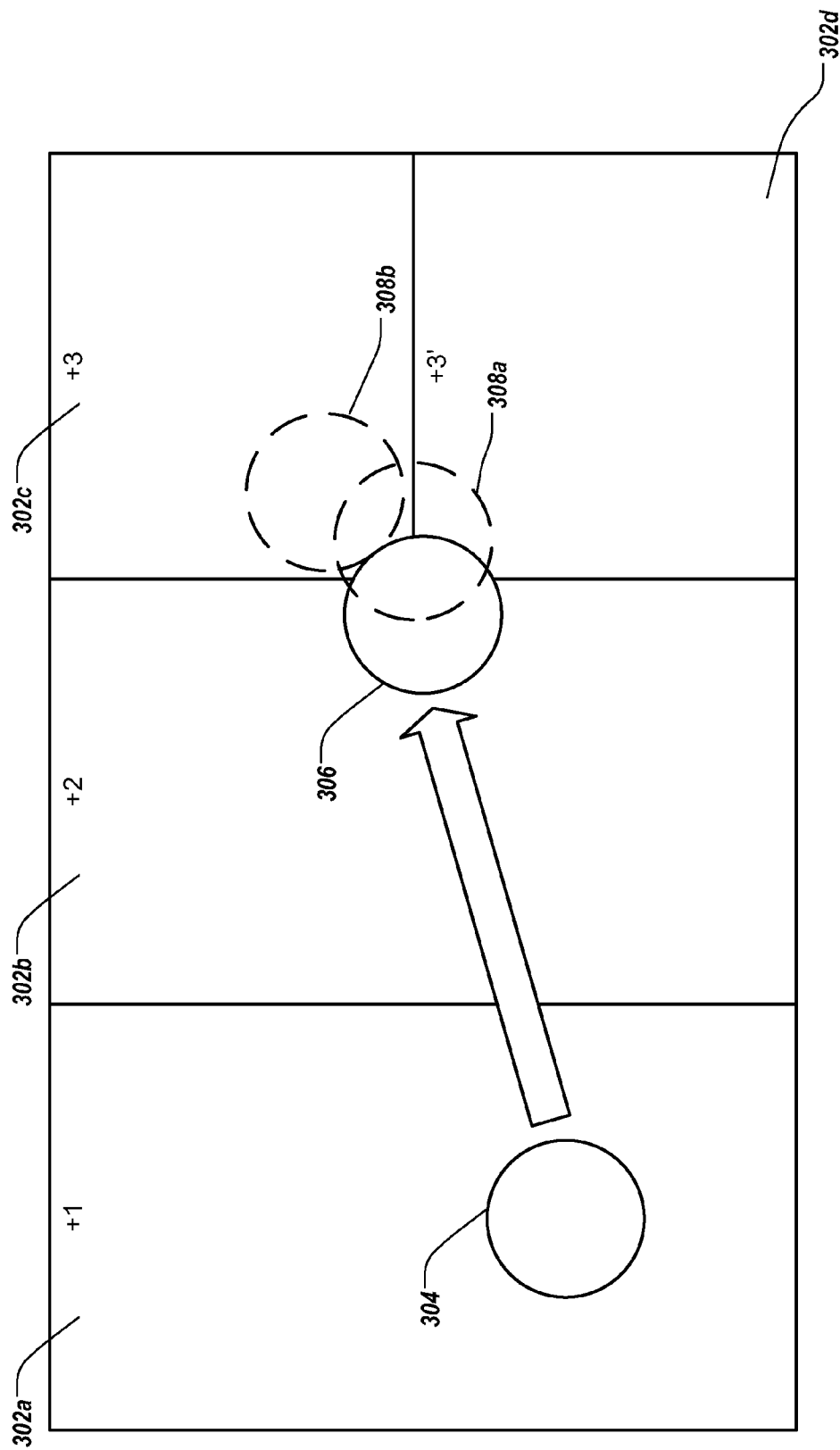
FIG. 3 illustrates techniques of determining a time zone based on a location when the location includes an error margin.

FIG. 3 illustrates techniques of determine a time zone based on a location when the location includes an error margin. For convenience, the techniques will be described using exemplary mobile device 100 that implements the techniques.

Locations 304, 306, and 308 can represent various locations determined to be current locations of mobile device 100. Geometric shapes 302*a-d* can represent various geographic regions, each corresponding to a specific time zone. For illustrative purposes, the time zones are standard time+1 (e.g., UTC time plus an offset of one hour), standard time+2, and standard time+3. Geometric shapes 302*c* and 302*d* can correspond to regions that are both located in a standard time+3 time zone, where the regions implement different DST schedules. For example, geometric shape 302*c* can correspond to a region that is associated to time standard time+3, where no DST applies. Geometric shape 302*d* can correspond to a region that is associated to time standard time+3', where DST applies during months April through September.

A current location (e.g., location 306) can intersect multiple geometric shapes (e.g., geometric shapes 302b, 302c, and 302d) at one time. For example, an error margin of location 306 can be substantial, such that it cannot be determined with certainty that mobile device is located in a particular geometric shape, where each of the multiple geometric shapes can correspond to a geographic region in a distinct time zone. Mobile device 100 can determine which time zone to use based on various time zone selection rules.

A time zone selection rule can specify that, when mobile device 100 is already set to a current time zone that is one of the multiple time zones, mobile device 100 is to keep the current time zone until the location is completely outside the geometric shape corresponding to a region of the current time zone. For example, mobile device 100 can have a current time zone standard time+2. When mobile device 100 moves from location 306 to location 308a, the current time zone can remain at standard time+2. When mobile device moves to location 308c, which does not intersect with geometric shape 302b, mobile device can be set to a new time zone (e.g., standard time+3).

In some implementations, mobile device 100 can use predictive calculations to determine a time zone. Mobile device 100 can predict a time at which mobile device 100 will leave a current time zone and enter a new time zone by detecting gradual location changes of mobile device 100. Mobile device 100 can poll current locations of mobile device 100 periodically, based on one or more of cell ID tracking, wireless access point positioning (e.g., by triangulating wireless assess points), and GPS. The polling can be performed at variable intervals. The intervals can vary based on a distance (e.g., a minimum distance) between mobile device 100 and a border of the current geometric shape (e.g., geometric shape 302a) in which mobile device 100 is located. For example, the interval (e.g., time period until a next poll) can be inversely proportional to the distance between mobile device 100 (e.g., mobile device 100 located at location 304) and a border (e.g., border between geometric shapes 302a and 302b) toward which mobile device 100 is traveling. The interval can be determined using the distance and a travel velocity of mobile device 100. In some implementations, the travel velocity can be a specified velocity (e.g., 500 hundred miles an hour). In some implementations, the velocity can be determined using a distance traveled during last n polls (e.g., the last two polls) and the time that elapsed between the last n polls. The interval can have a lower limit (e.g., ten minutes) that determines a maximum frequency of the polling (e.g., polls at most every ten minutes). Mobile device 100 can be predicted to leave the current time zone and enter the new time zone at an estimated time, even when a current location cannot be determined. The estimated time can be an approximation of a time at which mobile device 100 will cross the border. The estimated time can be calculated based on the distance to the border and travel velocity. At that time or after that time, mobile device 100 can be set to the new time zone. For example, mobile device 100 can cross a time zone boundary in an airplane, and switch time zones accordingly, even when no location change is detected in the airplane.

Sometimes, two or more time zones can be possible new time zones. For example, mobile device 100 located at location 306 can move towards the border between geometric shapes 302b and 302c as well as the border between geometric shapes 302b and 302d. In such cases, at estimated time of border crossing, mobile device 100 can opt to keep the current time zone unchanged until further information is available, or select a most probable new time zone. Mobile device 100 can determine a most probable new time zone based on a trajectory of mobile device 100 and which geometric shape the trajectory will intercept.

A time zone selection rule can specify that, when mobile device is set to a current time zone that is not one of the multiple time zones, mobile device 100 is to use a current time zone based on a largest area of intersection between the current location and the geometric shapes. For example, mobile device 100 can travel from location 304 to location 306. Mobile device 100 can have a last known time zone of standard time+1. At location 306, time zone functions 210 can determine an area of intersection between location 306 and each of the geometric shapes that intersects location 306 (e.g., geometric shapes 302b, 302c, and 302d). Time zone function 210 can select a largest area, and designate the time zone of the geometric shape that corresponds to the largest area (e.g., time zone standard time+2, of geometric shape 302b) as the time zone for mobile device 100.

Time zone functions 210 can use various algorithms to determine whether a location intersects a geometric shape. In some implementations, time zone functions 210 can use a tiered approach to determine intersection. In a coarse calculation, time zone functions 210 can compare extreme points in the location and extreme points in the geometric shape to determine if it is possible that an intersection exists. Time zone data store 230 can store bounding boxes for each geometric shape. A bounding box can be minimum bounding rectangles (MBR) having borders that correspond to extreme points of each geometric shape. The extreme points can include, for example, eastern-most, western-most, northern-most, and southern-most points of the geometric shape. The bounding boxes can be stored in a data structure for indexing and storing multi-dimensional information (e.g., an R-tree data structure). In the coarse calculation, the geometric shapes that do not overlap a location can be excluded. For example, time zone functions 210 can compare an eastern-most longitude of geographic shape 302b and western-most longitude of location 308b. If the western-most longitude of location 308b is east of the eastern-most longitude of geographic shape 302b, there will be no intersection. Likewise, northern-most and southern-most points can be used.

If the coarse calculation cannot exclude a possibility of intersection, a refined calculation can be used. Determining whether an intersection of a location (e.g., location 308a) and geometric shapes (e.g., geometric shapes 302b, 302c, and 302d) and determining an area of the intersection can be achieved using various clipping algorithms. Some example clipping algorithms include Weiler-Atherton clipping algorithm and Sutherland-Hodgman clipping algorithm.

Figure 4:
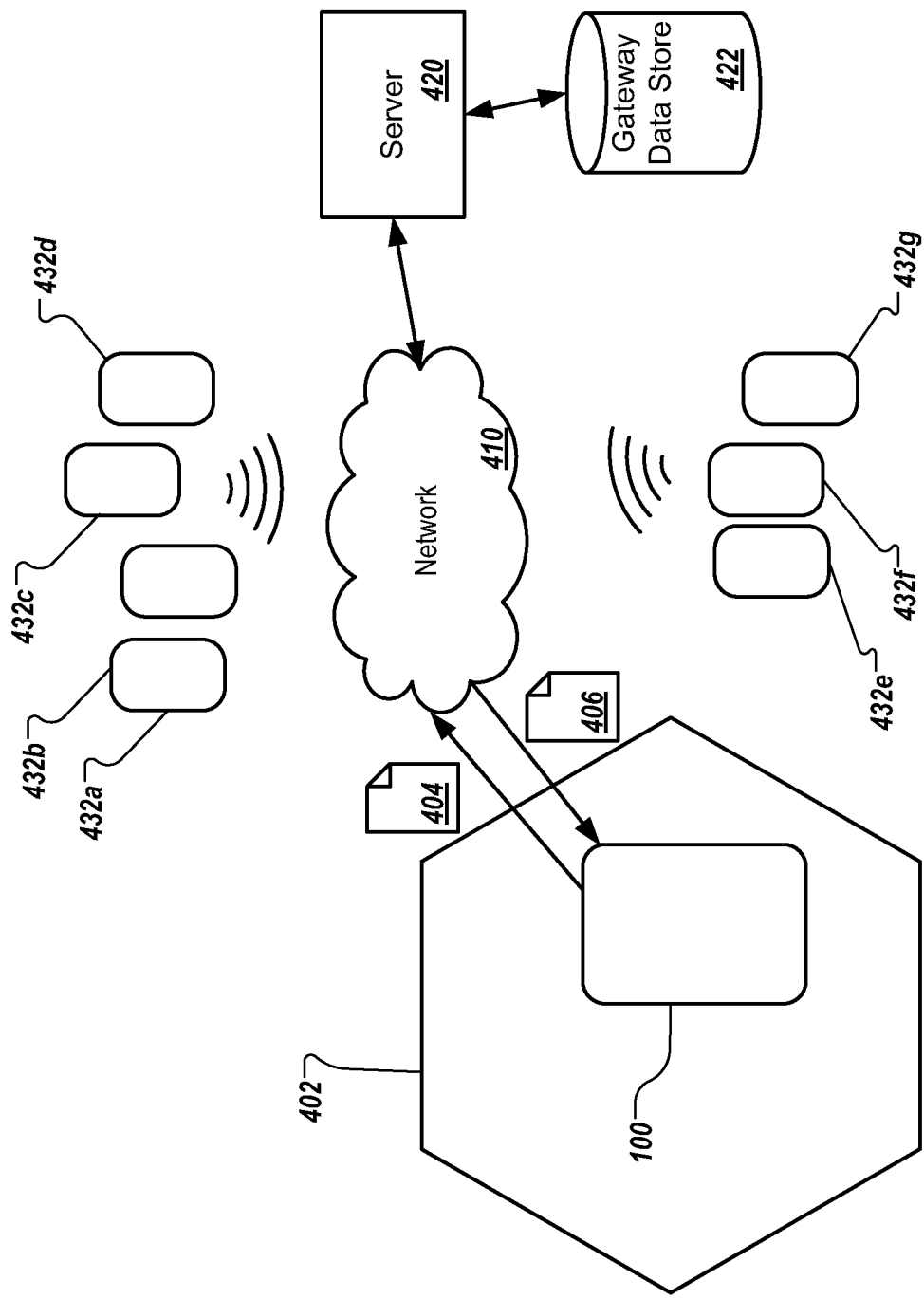
FIG. 4 illustrates an exemplary interaction between a mobile device and a server.

FIG. 4 illustrates an exemplary interaction between mobile device 100 and server 420. Mobile device 100 can include application subsystem 102 that includes time zone data store 230. Time zone data store 230 can store one or more location identifiers (e.g., cell IDs) and corresponding locations. The location identifiers can include cell IDs in a particular region (e.g., a country). Mobile device 100 can request an update of the location identifiers stored in location data store 230 from server 420 when mobile device 100 is located in cell 402.

When traveling between time zones, mobile device 100 can travel in an airplane. During the travel, mobile device 100 can be set to an "airplane" mode in which mobile device 100 does not detect cell ID change. By airplane, mobile device 100 can travel from a first country to a second county. When application subsystem 102 receives a location change notification (e.g., when mobile device 100 disembarks in the second country), the new cell ID in the second country (e.g., cell ID of cell 402) may not be stored in time zone data store 230. For example, in some implementations, time zone data store 230 can store cell IDs of a particular country (e.g., the first country). When mobile device 100 fails to find a current cell ID in time zone data store 230, mobile device 100 can request an update from server 420.

Mobile device 100 can transmit request 404 to a server 420 through network 410 to request location identifiers that includes the current cell ID. Request 404 can include current location information as well as type of location identifiers requested. The current location information can include, for example, one or more of current cell ID, current LAC, current MNC, and current MCC. The type of location identifiers can include whether mobile device 100 seeks identifiers of wireless access points, cell IDs, LACs, MNCs, or MCCs.

Upon receiving request 404, server 420 can identify one or more location identifiers from gateway data store 422 to be transmitted to mobile device 100. Identifying the location identifiers from gateway data store 422 can include, for example, identifying some or all cell IDs corresponding to the LAC or MCC in request 404. The identified location identifiers, as well as locations associated with the location identifiers, can be transmitted to mobile device 100 in response 406. Upon receiving response 406, mobile device 100 can retrieve the location identifiers and associated locations and store the retrieved location identifiers and associated locations in time zone data store 230.

The locations associated with the location identifiers stored in gateway data store 422 can be determined using various geometric and statistical calculations. For example, a location associated with a cell ID of a particular cell can be determined using locations of location-aware mobile device 432a-g that are within the cell. Location-aware mobile device 432a-g can transmit geographic coordinates of the current locations of location-aware mobile device 432a-g as well as the cell ID to server 420. Server 420 can determine the location of the cell ID by averaging the geographic coordinates. The location determined by the averaging can be designated as a most probable location of a mobile device (e.g., mobile device 100) that is in the cell.

In some implementations, gateway data store 422 can store a canonical identifier for each time zone, and time zone specific information associated with the canonical identifier. The time zone specific information can include current, historical, and future DST information for the time zone. The DST information can include rules indicating DST regulation changes that are to be applied on a particular date or during a particular period. For example, the rules can specify that, for one or more time zones (e.g., the Eastern, Central, Mountain, and Pacific time zones of the United States), DST starts on a first day or date (e.g., first Sunday in April) in a first year, and on a second day or date (e.g., first Sunday in March) in years after the first year. Mobile device 100 can request DST information in request 404 and receive the requested DST information in response 406. The received DST information can be stored in time zone data store 230 of mobile device 100. The stored DST information can be used to dynamically configure the DST offset associated with the geometric shapes associated with the one or more time zones.

Figure 5:
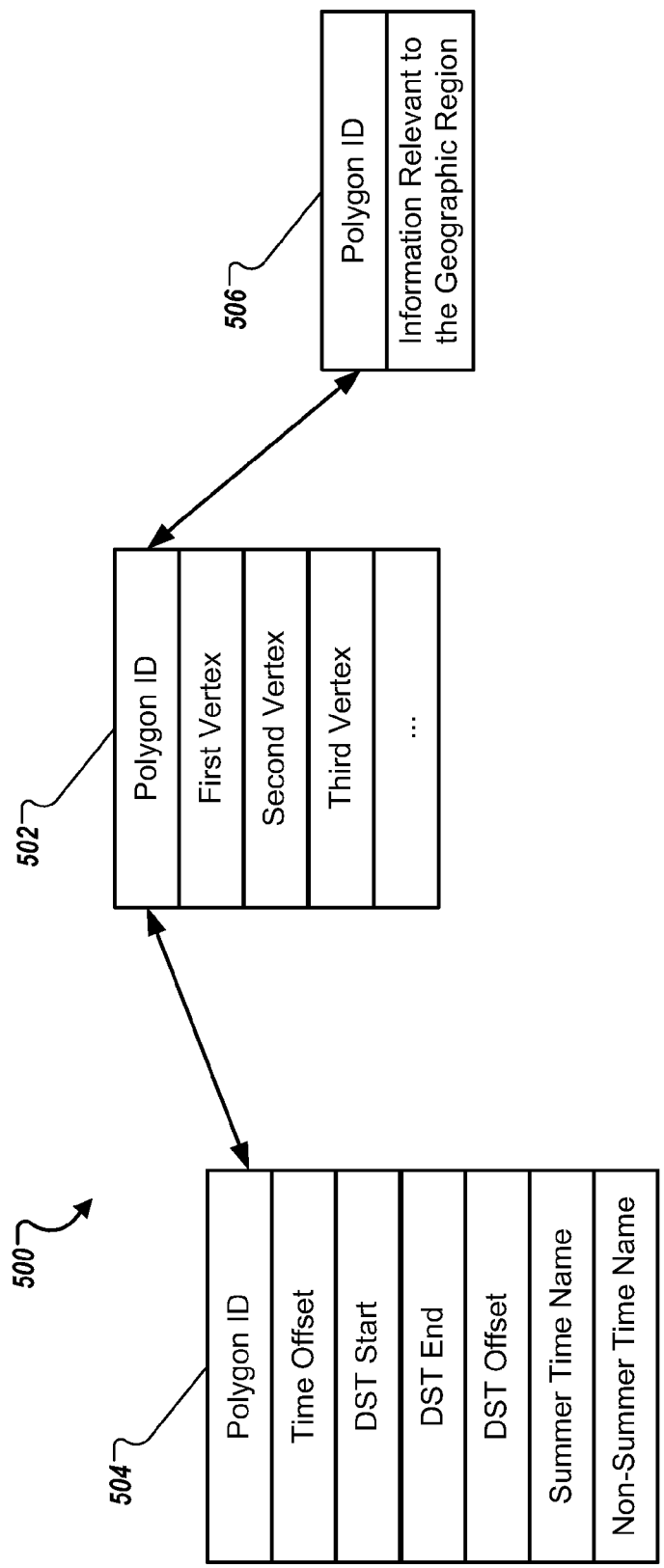
FIG. 5 illustrates an exemplary data structure for storing geometric shapes associated with time zones.

FIG. 5 illustrates exemplary data structure 500 for storing geometric shapes associated with time zones. Data structure 500 can be implemented in various ways, for example, in a relational database, in an object-oriented database, or as binary or American Standard Code for Information Interchange (ASCII) flat files. For convenience, the geometric shapes associated with time zones will be referred to as polygons.

Polygon data structure 502 can include a polygon identifier (polygon ID) data field that can identify a polygon, and one or more vertex data fields for storing various vertices of the polygon. In various implementations, the vertex data fields can correspond to one or more data columns in a relational database. Each vertex can be represented as a value pair, including a longitude and a latitude, or a value triplet, including a longitude, a latitude, and an altitude. The vertex data fields can be stored in an array or a linked list. The vertex data fields can be stored in binary or ASCII. Each vertex data field can include a longitude coordinate, a latitude coordinate, and optionally, an altitude coordinate of a vertex of the polygon. A polygon can have one or more holes in it, e.g., areas completely enclosed in the polygon that are not part of the polygon. For example, the state of Arizona can correspond to a polygon containing a hole. Arizona does not observe DST, therefore can be represented as a polygon separate from polygons for Pacific Time Zone (to the west) and Mountain Time Zone (to the north and east). A certain enclave (e.g., Navajo Nation) in the state of Arizona, completely enclosed in Arizona, observes DST and uses the Mountain Time Zone of the United States as of year 2010. Because Navajo Nation has DST settings that differ from the DST settings of the rest of Arizona, Navajo Nation can be represented by one or more distinct polygons. The polygon corresponding to the Arizona therefore can have one or more holes. A polygon that contains one or more holes can be represented with multiple vertex data fields, each hole in the polygon being represented by a separate column, array, or linked list.

Polygon data structure 502 can relate to time zone data structure 504 using the polygon ID. Time zone data structure 540 can include time zone information that corresponds to the polygon identified by the polygon ID. The time zone information can include a time offset (e.g., +1, −1, +5.5, etc.) data field, which can specify an amount of time offset (e.g., in hours) from a standard time. The time zone information can include a DST start data field, a DST end data field, and a DST offset data field. The DST start data field can include a month, day or date, and time that daylight savings time starts. The DST end data field can include a month, day or date, and time that daylight savings time ends. The DST offset data field can include an offset, if any, from the local time when DST applies. The time zone information can include a summer time name (e.g., "Pacific Daylight Time (PDT)") and a non-summer time name (e.g., "Pacific Standard Time (PST)").

Polygon data structure 502 can relate to additional information data structure 504 using the polygon ID. Additional information data structure 502 can be used to store one or more configurable parameters that can be used to identify information relevant to the geographic region represented by the polygon. For example, the configurable parameters can specify a link to a currency conversion tool that can convert a user specified currency (e.g., a home currency) to local currency, based on the current location of mobile device 100. The configurable parameters can be stored on time zone data store 230.

A mobile device (e.g., mobile device 100) can be located at a location that is outside all polygons stored in time zone data store 230 using polygon data structure 502. For example, mobile device 100 can be located on a ship away from any country. In such cases, mobile device 100 can determine a current location using GPS (if so equipped), and determine a time zone based on longitude determined by the GPS. In some implementations, determine the time zone can further be based on a latitude determined by the GPS, for example, when the longitude is close to 180°, due to the zigzag feature of the International Date Line.

Exemplary Processes of Determining Time Zone Based on Location

Figure 6:
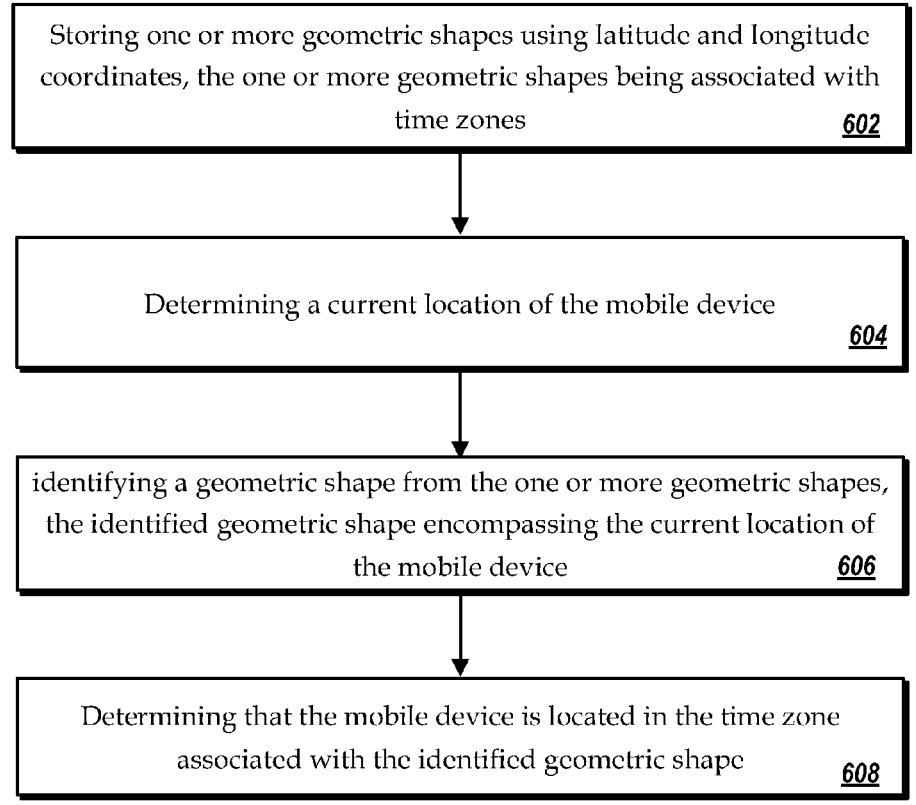
FIG. 6 is a flowchart illustrating an exemplary process of determining a time zone based on a location.

FIG. 6 is a flowchart illustrating exemplary process 600 of determining a time zone based on a location. For convenience, process 600 will be described in reference to mobile device 100 that implements process 600.

Mobile device 100 can store (602) one or more geometric shapes using latitude and longitude coordinates, the one or more geometric shapes being associated with time zones. Storing the one or more geometric shapes using the latitude and longitude coordinates can include storing the one or more geometric shapes as polygons using the latitude and longitude coordinates of the vertices of the polygons. The time zones can be represented using offsets from a standard time. The standard time can be kept by internal clock 232 of mobile device 100, and can be updated using wired or wireless time synchronization. The offsets can include offsets that reflect daylight savings settings associated with the geometric shapes.

Mobile device 100 can determine (604) a current location of mobile device 100. In a GPS-enabled mobile device, determining the current location of the mobile device can include determining the current location of the mobile device using a GPS signal. In some implementations, determining the current location of the mobile device can include determining the current location using triangulation of positions of wireless access points in a wireless local area network (WLAN).

In some implementations, determining the current location of the mobile device can include determining the current location using a location identifier. Mobile device 100 can determine an identifier (e.g., a cell ID) of a current wireless access gateway (e.g., a cell tower). Mobile device 100 can determine the current location using the identifier, for example, by performing a lookup in time zone data store 230.

The current location of mobile device 100 can be represented as a geographic area. In FIG. 3, locations 304, 306, 308a, and 308b are represented as circular areas. The locations can be represented as any geographic shape (e.g., polygons or free-style geographic shapes). The geographic shape can be determined statistically, for example, by measuring concentration of location-aware mobile device that are connected to a particular cell tower.

Mobile device 100 can identify (606) a geometric shape from the one or more geometric shapes. The identified geometric shape can include the current location of mobile device 100. For example, the identified geometric shape can enclose the current location or intersect with the current location when the current location is represented as a geographic area.

Mobile device 100 can determine (608) that mobile device 100 is located in the time zone associated with the identified geometric shape. In some implementations, determining that mobile device 100 is located in the time zone can include determining that the geographic area (e.g., geographic area corresponding to location 306) that represents the location of mobile device 100 intersects multiple geometric shapes (e.g., geometric shapes 302b, 302c, and 302d). Each of the multiple geometric shapes can include a portion of the geographic area. Mobile device 100 can identify the geometric shape (e.g., geometric shape 302b) from the plurality of geometric shapes, the geometric shape including a largest portion of the geographic area. Mobile device 100 can set a current time of mobile device 100 according to the time zone (e.g., standard time+2) associated with the identified geometric shape.

Exemplary Mobile Device Architecture

Figure 7:
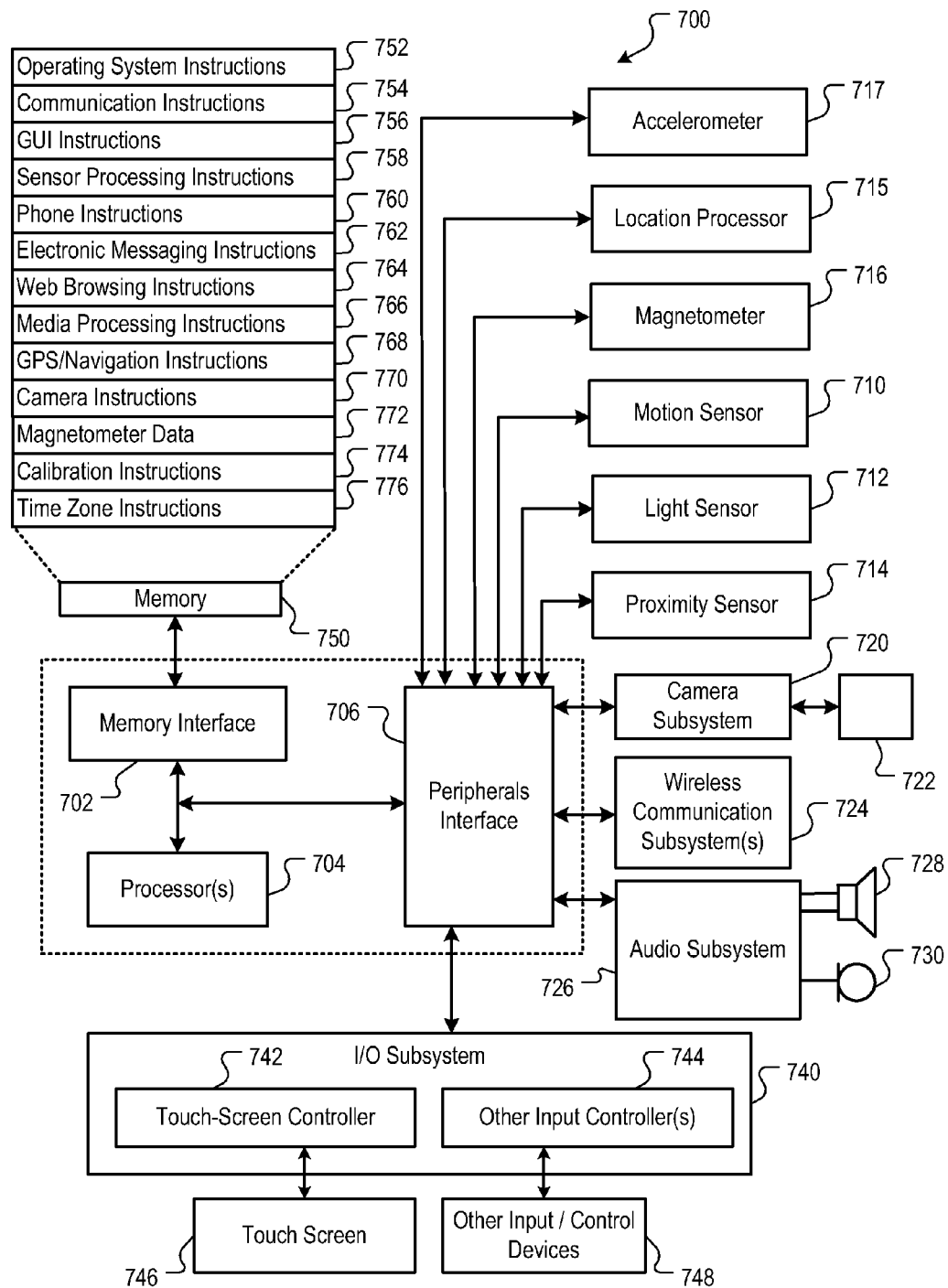
FIG. 7 is a block diagram illustrating an exemplary device architecture of a mobile device implementing the features and operations described in reference to FIGS. 1-6.

FIG. 7 is a block diagram of an exemplary architecture 700 for the mobile devices of FIGS. 1-6. A mobile device (e.g., mobile device 100) can be, for example, a handheld computer, a personal digital assistant, a cellular telephone, an electronic tablet, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile device 100 can include memory interface 702, one or more data processors, image processors and/or processors 704, and peripherals interface 706. Memory interface 702, one or more processors 704 and/or peripherals interface 706 can be separate components or can be integrated in one or more integrated circuits. Processors 704 can include application processors (APs) and baseband processors (BPs). The various components in mobile device 100, for example, can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the mobile device. Location processor 715 (e.g., GPS receiver) can be connected to peripherals interface 706 to provide geopositioning. Electronic magnetometer 716 (e.g., an integrated circuit chip) can also be connected to peripherals interface 706 to provide data that can be used to determine the direction of magnetic North. Thus, electronic magnetometer 716 can be used as an electronic compass. Accelerometer 717 can also be connected to peripherals interface 706 to provide data that can be used to determine change of speed and direction of movement of the mobile device.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which a mobile device is intended to operate. For example, a mobile device can include communication subsystems 724 designed to operate over a GSM network, a GPRS network, an EDGE network, a Wi-Fi or WiMax network, and a Bluetooth network. In particular, the wireless communication subsystems 724 can include hosting protocols such that the mobile device can be configured as a base station for other wireless devices.

Audio subsystem 726 can be coupled to a speaker 728 and a microphone 730 to facilitate voice-enabled functions, such as voice recognition, voice replication, digital recording, and telephony functions.

I/O subsystem 740 can include touch screen controller 742 and/or other input controller(s) 744. Touch-screen controller 742 can be coupled to a touch screen 746 or pad. Touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 746.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In one implementation, a pressing of the button for a first duration may disengage a lock of the touch screen 746; and a pressing of the button for a second duration that is longer than the first duration may turn power to mobile device 100 on or off. The user may be able to customize a functionality of one or more of the buttons. The touch screen 746 can, for example, also be used to implement virtual or soft buttons and/or a keyboard.

In some implementations, mobile device 100 can present recorded audio and/or video files, such as MP3, AAC, and MPEG files. In some implementations, mobile device 100 can include the functionality of an MP3 player, such as an iPod™ Mobile device 100 may, therefore, include a pin connector that is compatible with the iPod. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; magnetometer data 772 and calibration instructions 774 to facilitate magnetometer calibration. The memory 750 may also store other software instructions (not shown), such as security instructions, web video instructions to facilitate web video-related processes and functions, and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750. Memory 750 can include time zone instructions 776 that can be used to determine a location of mobile device 100, determine a geometric shape that includes the location, and determine a time zone associated with the geometric shape.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

Exemplary Operating Environment

Figure 8:
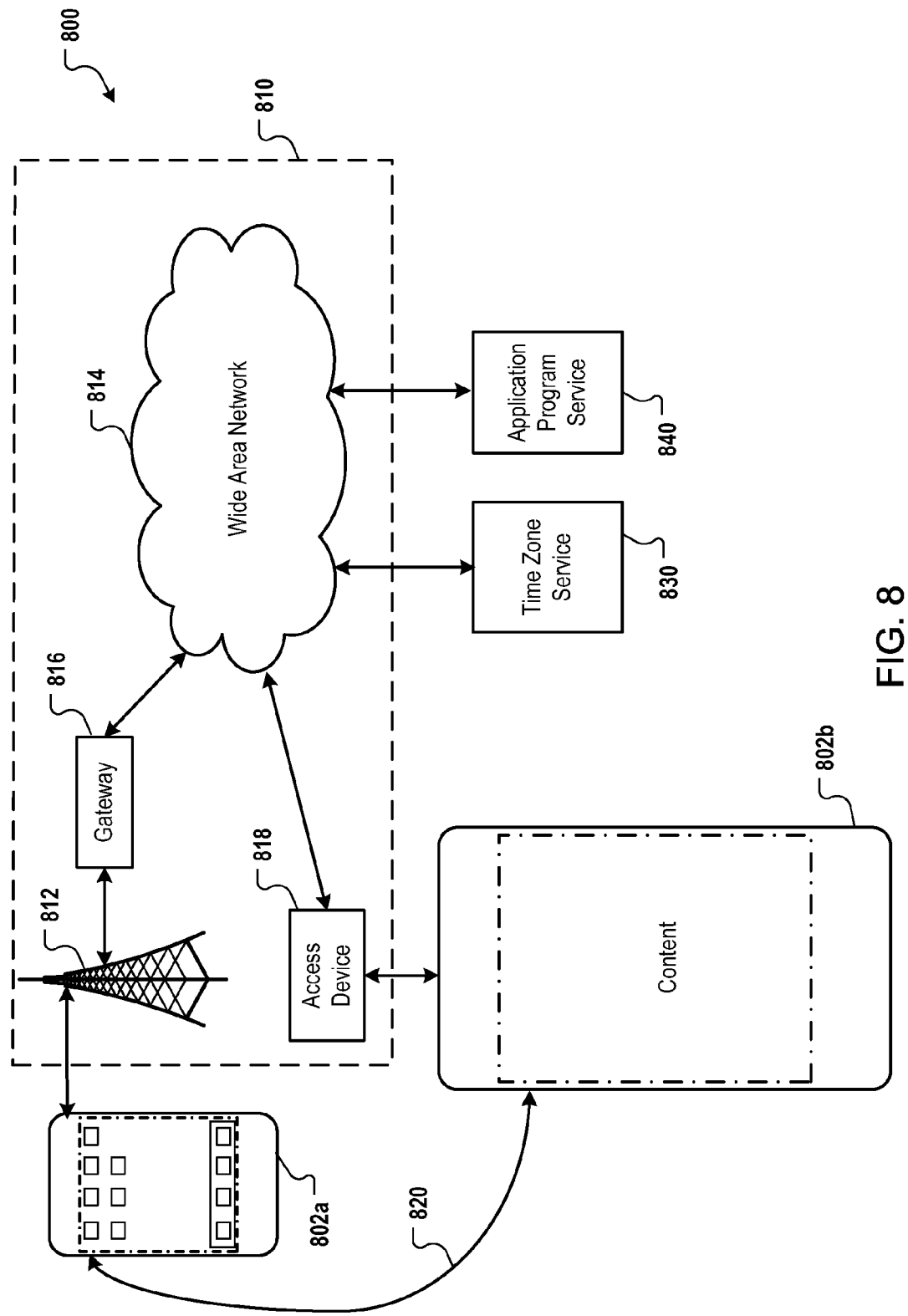
FIG. 8 is a block diagram of an exemplary network operating environment for the mobile devices of FIGS. 1-7.

FIG. 8 is a block diagram of an exemplary network operating environment 800 for the mobile devices of FIGS. 1-7. Mobile devices 802*a* and 802*b* can, for example, communicate over one or more wired and/or wireless networks 810 in data communication. For example, a wireless network 812, e.g., a cellular network, can communicate with a wide area network (WAN) 814, such as the Internet, by use of a gateway 816. Likewise, an access device 818, such as an 802.11g wireless access device, can provide communication access to the wide area network 814.

In some implementations, both voice and data communications can be established over wireless network 812 and the access device 818. For example, mobile device 802*a* can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 812, gateway 816, and wide area network 814 (e.g., using Transmission Control Protocol/Internet Protocol (TCP/IP) or User Datagram Protocol (UDP)). Likewise, in some implementations, the mobile device 802*b* can place and receive phone calls, send and receive e-mail messages, and retrieve electronic documents over the access device 818 and the wide area network 814. In some implementations, mobile device 802*a* or 802*b* can be physically connected to the access device 818 using one or more cables and the access device 818 can be a personal computer. In this configuration, mobile device 802*a* or 802*b* can be referred to as a "tethered" device.

Mobile devices 802*a* and 802*b* can also establish communications by other means. For example, wireless device 802*a* can communicate with other wireless devices, e.g., other mobile devices 802*a* or 802*b*, cell phones, etc., over the wireless network 812. Likewise, mobile devices 802*a* and 802*b* can establish peer-to-peer communications 820, e.g., a personal area network, by use of one or more communication subsystems, such as the Bluetooth™ communication devices. Other communication protocols and topologies can also be implemented.

The mobile device 802*a* or 802*b* can, for example, communicate with one or more services 830 and 840 over the one or more wired and/or wireless networks. For example, one or more time zone services 830 can determine one or more identifiers of wireless access gateways associated with a geographic region, and provide the one or more identifiers to mobile devices 802 for determining locations using the location identifiers (e.g., cell IDs).

Application program service 840 can, for example, provide application programs 106 for download to mobile device 802. The application programs can include application programs that require a local time to function properly (e.g., alarm clocks, calendars, and event schedulers).

Mobile device 802*a* or 802*b* can also access other data and content over the one or more wired and/or wireless networks. For example, content publishers, such as news sites, Really Simple Syndication (RSS) feeds, web sites, blogs, social networking sites, developer networks, etc., can be accessed by mobile device 802*a* or 802*b*. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention. For example, locations of a mobile device, when uncertainty is involved, are represented as circles in the figures. The actual shape of a location of the mobile device can have many geometric form (e.g., polygons, ellipses, or other shapes).

What is claimed is:

1. A method, comprising:
    storing a plurality of bounding boxes of geometric shapes using latitude and longitude coordinates, each of the geometric shapes being associated with a time zone;
    determining, by a mobile device, that a current location of the mobile device intersects both a first bounding box of a first geometric shape corresponding to a first time zone and a second bounding box of a second geometric shape corresponding a second time zone, the current location being an area a size of which corresponds to an error margin of the current location, the error margin indicating an uncertainty of whether the mobile device is located in the first geometric shape or in the second geometric shape, the uncertainty being caused by at least one of:
    an interference of a global positioning system signal by a vehicle carrying the mobile device, the global positioning system signal usable by the mobile device to determine the current location; or
    an operating mode that disables a location determining function of the mobile device,
    wherein, when the vehicle interferes with the global positioning system signal or when the mobile device is in the operating mode, the mobile device determines the current location using a signal from a wireless access point or a cellular communications network and using an identifier of a wireless access gateway, and
    wherein a first portion of the area is in the first bounding box, a second portion of the area is in the second bounding box, and wherein a current time zone setting of the mobile device is the first time zone;
    keeping the current time zone setting of the mobile device to the first time zone until the current location of the mobile device ceases to intersect the first bounding box, wherein the current location ceases to intersect the first bounding box when each portion of the area is outside of the first bounding box; and
    triggering a time zone change upon determining that the current location of the mobile device ceases to intersect the first bounding box, including setting the current time zone of the mobile device to the second time zone.

2. The method of claim 1, wherein at least one of the first time zone or second time zone is represented using an offset from a standard time.

3. The method of claim 2, wherein the offset reflects a daylight savings setting local to the respective time zone.

4. The method of claim 1, wherein the current location of the mobile device is represented as a geographic area.

5. The method of claim 4, wherein each bounding box of a corresponding geometric shape is a minimum bounding rectangle having borders that correspond to extreme points of the corresponding geometric shape, an extreme point of the corresponding geometric shape being one of an easternmost point of the geometric shape, a southernmost point of the geometric shape, a westernmost point of the geometric shape, or a northernmost point of the geometric shape, wherein the minimum bounding rectangle is a rectangle where each of the easternmost point, southernmost point, westernmost point, and northernmost point is on a respective edge of the rectangle.

6. The method of claim 1, wherein storing the bounding boxes includes storing the bounding boxes as polygons using latitude and longitude coordinates of vertices of the polygons.

7. The method of claim 1, wherein the error margin is larger than a location error margin of the global positioning system.

8. A system, comprising:
    a mobile device configured to perform operations comprising:
    storing a plurality of bounding boxes of geometric shapes using latitude and longitude coordinates, each of the geometric shapes being associated with a time zone;
    determining that a current location of the mobile device intersects both a first bounding box of a first geometric shape corresponding to a first time zone and a second bounding box of a second geometric shape corresponding a second time zone, the current location being an area a size of which corresponds to an error margin of the current location, the error margin indicating an uncertainty of whether the mobile device is located in the first geometric shape or in the second geometric shape, the uncertainty being caused by at least one of:
    an interference of a global positioning system signal by a vehicle carrying the mobile device, the global positioning system signal usable by the mobile device to determine the current location; or
    an operating mode that disables a location determining function of the mobile device,
    wherein, when the vehicle interferes with the global positioning system signal or when the mobile device is in the operating mode, the mobile device determines the current location using a signal from a wireless access point or a cellular communications network and using an identifier of a wireless access gateway, and
    wherein a first portion of the area is in the first bounding box, a second portion of the area is in the second bounding box, and wherein a current time zone setting of the mobile device is the first time zone;
    keeping the current time zone setting the mobile device to the first time zone until the current location of the mobile device ceases to intersect the first bounding box, wherein the current location ceases to intersect the first bounding box when each portion of the area is outside of the first bounding box; and
    triggering a time zone change upon determining that the current location of the mobile device ceases to intersect the first bounding box, including setting the current time zone of the mobile device to the second time zone.

9. The system of claim 8, wherein at least one of the first time zone or second time zone is represented using an offset from a standard time.

10. The system of claim 9, wherein the offset reflects a daylight savings setting local to the respective time zone.

11. The system of claim 8, wherein the current location of the mobile device is represented as a geographic area.

12. The system of claim 11, wherein each bounding box of a corresponding geometric shape is a minimum bounding rectangle having borders that correspond to extreme points of the corresponding geometric shape, an extreme point of the corresponding geometric shape being one of an easternmost point of the geometric shape, a southernmost point of the geometric shape, a westernmost point of the geometric shape, or a northernmost point of the geometric shape, wherein the minimum bounding rectangle is a rectangle where each of the easternmost point, southernmost point, westernmost point, and northernmost point is on a respective edge of the rectangle.

13. The system of claim 8, wherein storing the bounding boxes includes storing the bounding boxes as polygons using latitude and longitude coordinates of vertices of the polygons.

14. The system of claim 8, wherein the error margin is larger than a location error margin of the global positioning system.

15. A computer program product stored on a storage device, which, when activated, is operable to cause one or more processors to perform operations comprising:
   storing a plurality of bounding boxes of geometric shapes using latitude and longitude coordinates, each of the geometric shapes being associated with a time zone;
   determining, by a mobile device, that a current location of the mobile device intersects both a first bounding box of a first geometric shape corresponding to a first time zone and a second bounding box of a second geometric shape corresponding a second time zone, the current location being an area a size of which corresponds to an error margin of the current location, the error margin indicating an uncertainty of whether the mobile device is located in the first geometric shape or in the second geometric shape, the uncertainty being caused by at least one of:
   an interference of a global positioning system signal by a vehicle carrying the mobile device, the global positioning system signal usable by the mobile device to determine the current location; or
   an operating mode that disables a location determining function of the mobile device,
   wherein, when the vehicle interferes with the global positioning system signal or when the mobile device is in the operating mode, the mobile device determines the current location using a signal from a wireless access point or a cellular communications network and using an identifier of a wireless access gateway, and
   wherein a first portion of the area is in the first bounding box, a second portion of the area is in the second bounding box, and wherein a current time zone setting of the mobile device is the first time zone;
   keeping the current time zone setting of the mobile device to the first time zone until the current location of the mobile device ceases to intersect the first bounding box, wherein the current location ceases to intersect the first bounding box when each portion of the area is outside of the first bounding box; and
   triggering a time zone change upon determining that the current location of the mobile device ceases to intersect the first bounding box, including setting the current time zone of the mobile device to the second time zone.

16. The product of claim 15, wherein at least one of the time zone or second time zone is represented using an offset from a standard time.

17. The product of claim 16, wherein the offset reflects a daylight savings setting local to the respective time zone.

18. The product of claim 15, wherein the current location of the mobile device is represented as a geographic area.

19. The product of claim 18, wherein each bounding box of a corresponding geometric shape is a minimum bounding rectangle having borders that correspond to extreme points of the corresponding geometric shape, an extreme point of the corresponding geometric shape being one of an easternmost point of the geometric shape, a southernmost point of the geometric shape, a westernmost point of the geometric shape, or a northernmost point of the geometric shape, wherein the minimum bounding rectangle is a rectangle where each of the easternmost point, southernmost point, westernmost point, and northernmost point is on a respective edge of the rectangle.

20. The system of claim 15, wherein the error margin is larger than a location error margin of the global positioning system.

* * * * *